(12) United States Patent
Gordin

(10) Patent No.: US 8,768,382 B1
(45) Date of Patent: Jul. 1, 2014

(54) ASSISTED GPS DATA MANAGEMENT

(75) Inventor: Denis Gordin, Modiin (IL)

(73) Assignee: Marvell International Ltd., Hamilton (BM)

(*) Notice: Subject to any disclaimer, the term of this patent is extended or adjusted under 35 U.S.C. 154(b) by 715 days.

(21) Appl. No.: 12/262,787

(22) Filed: Oct. 31, 2008

Related U.S. Application Data

(60) Provisional application No. 60/984,192, filed on Oct. 31, 2007.

(51) Int. Cl.
*H04W 24/00* (2009.01)

(52) U.S. Cl.
USPC .................. 455/456.2; 455/456.1; 455/456.3; 455/456.6

(58) Field of Classification Search
CPC ....... H04W 4/02; H04W 4/025; H04W 64/00; H04W 40/20; H04W 4/04
USPC .......... 455/404.2, 456.1, 456.2, 456.5, 456.6, 455/414.1, 414.2, 422.1, 456.3, 457; 370/310.2, 328
See application file for complete search history.

(56) References Cited

U.S. PATENT DOCUMENTS

| | | | |
|---|---|---|---|
| 5,293,318 A * | 3/1994 | Fukushima | 701/216 |
| 2002/0111171 A1* | 8/2002 | Boesch et al. | 455/456 |
| 2003/0148771 A1* | 8/2003 | de Verteuil | 455/456 |
| 2003/0224804 A1 | 12/2003 | Liu | |
| 2007/0001901 A1* | 1/2007 | Yeh et al. | 342/357.09 |
| 2008/0227465 A1 | 9/2008 | Wachter et al. | |
| 2009/0009389 A1* | 1/2009 | Mattos | 342/357.15 |
| 2009/0093234 A1 | 4/2009 | Cai | |

* cited by examiner

*Primary Examiner* — Dinh P Nguyen

(57) ABSTRACT

A method of determining a position includes acquiring and storing Assisted Satellite Positioning (ASP) data in a mobile user equipment associated with a cellular network. Upon receiving a request for a position determination service, it is determined whether the ASP data is usable for the requested position determination service. When the ASP data is usable for the requested position determination service, the position of the mobile user equipment is determined based partially on the ASP data.

26 Claims, 3 Drawing Sheets

ASSISTED GPS DATA MANAGEMENT

CROSS REFERENCE TO PRIOR APPLICATION

This application claims priority and the benefit thereof from U.S. Provisional Application No. 60/984,192 filed on Oct. 31, 2007, which is hereby incorporated by reference for all purposes as if fully set forth herein.

BACKGROUND

1. Field of the Disclosure

This disclosure relates to Assisted Global Positioning System (AGPS) data management, and particularly to a mobile station having AGPS data management and an AGPS data management process in a mobile station.

2. Related Art

Assisted GPS (AGPS) is commonly used to enhance the startup performance (i.e., Time to First Fix (TTFF)) of GPS receivers, such as, e.g., cellular phones with GPS capabilities. AGPS typically uses an assistance server connected to a GPS receiver via a cellular network. The assistance server can approximately locate a GPS receiver by which base station the GPS receiver is connected to on a cellular network, and can make use of fragmentary signals, provide better knowledge of atmospheric conditions, and can supply orbital data based on the location of a base station to which the GPS receiver is connected. AGPS data may be delivered to the GPS receiver via the cellular network. Based on the received AGPS data, the GPS receiver may start without complete GPS data from the GPS satellites. However, GPS receivers are not properly configured to efficiently manage AGPS data received from the assistance server.

SUMMARY

In one aspect of the disclosure, a method of determining a position includes acquiring and storing the first Assisted Satellite Positioning (ASP) data in a mobile user equipment associated with a cellular network, receiving a request for a position determination service, determining whether the first ASP data is usable for the requested position determination service, and determining a position of the mobile user equipment based partially on the first ASP data when the first ASP data is usable for the requested position determination service.

According to another aspect of the disclosure, a computer readable storage medium having a stored computer program embodying instructions, which, when executed by a computer, cause the computer to determine a position, includes instructions for acquiring and storing the first Assisted Satellite Positioning (ASP) data in a mobile user equipment associated with a cellular network, instructions for receiving a request for a position determination service, instructions for determining whether the first ASP data is usable for the requested position determination service, and instructions for determining a position of the mobile user equipment based partially on the first ASP data when the first ASP data is usable for the requested position determination service.

In yet another aspect of the disclosure, a method of managing Assisted Satellite Positioning (ASP) data in a mobile station includes acquiring and storing the first ASP data and the first location information associated with the first ASP data, receiving a request for a position determination service, acquiring the second location information upon receiving the request, determining whether the stored first ASP data is older than a predetermined period of time, determining whether the first location information and the second location information are the same, and utilizing the first ASP data when the first ASP data is not older than the predetermined period of time and the first location information and the second location information are the same.

In yet another aspect of the disclosure, a computer readable storage medium having a stored computer program embodying instructions, which, when executed by a computer, cause the computer to manage Assisted Satellite Positioning (ASP) data in a mobile station, includes instructions for acquiring and storing the first ASP data and the first location information associated with the first ASP data, instructions for receiving a request for a position determination service, instructions for acquiring the second location information upon receiving the request, instructions for determining whether the stored first ASP data is older than a predetermined period of time, instructions for determining whether the first location information and the second location information are the same, and instructions for utilizing the first ASP data when the first ASP data is not older than the predetermined period of time and the first location information and the second location information are the same.

In yet another aspect of the disclosure, a mobile station includes a storage unit storing the first Assisted Satellite Positioning (ASP) data and the first location information associated with the first ASP data, a user interface configured to receive a user request for a position determination service, a cellular unit configured to acquire the second location information upon receiving the user request, and a processor configured to retrieve the first ASP data when the first ASP data is not older than a predetermined period of time and the first location information and the second location information are the same.

Additional features, advantages, and embodiments of the disclosure may be set forth or apparent from consideration of the following detailed description, drawings, and claims. Moreover, it is to be understood that both the foregoing summary of the disclosure and the following detailed description are mere examples and intended to provide further explanation without limiting the scope of the disclosure as claimed.

BRIEF DESCRIPTION OF THE DRAWINGS

The accompanying drawings illustrate embodiments of the disclosure, and together with the detailed description serve to explain teaching principles of the disclosure. No attempt is made to show structural details of the disclosure in any more detail than may be necessary to understand teaching principles and elucidate examples of various ways in which it may be practiced. In the drawings.

DETAILED DESCRIPTION

Figure 1:
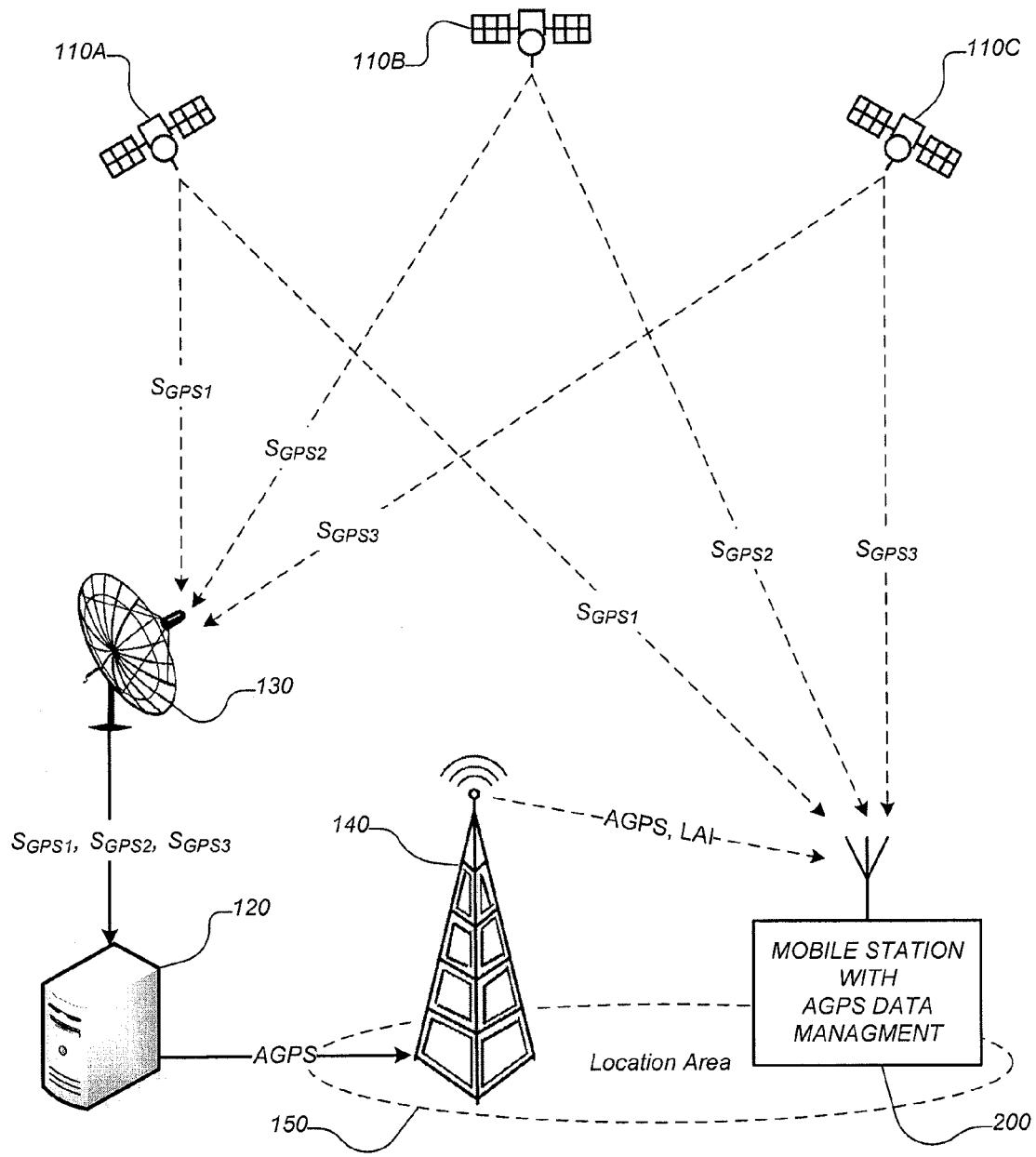
FIG. 1 shows an overview of an AGPS system having AGPS data management, according to an embodiment of the disclosure.

The embodiments of the disclosure and various features thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments. Descriptions of well-known components and processing techniques may be omitted so as to not unnecessarily obscure teaching principles of embodiments described herein. The examples used herein are intended merely to facilitate an understanding of ways in which embodiments of the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

The method and apparatus described herein may be used with various satellite positioning systems, such as the United States Global Positioning System (GPS), the Russian Glonass system, the European Galileo system, any system that uses satellites from a combination of satellite systems, or any satellite system developed in the future. However, for brevity, the foregoing examples will be directed to the GPS although the concept may be applied to any system. Furthermore, the disclosed methods and apparatus may be used with positioning determination systems that utilize pseudolites or a combination of satellites and pseudolites. The term "satellite" as used herein, is intended to include pseudolites, equivalents of pseudolites, and possibly others.

FIG. 1 shows an overview of an Assisted Satellite Positioning (ASP) system 100, such as, e.g., an Assisted GPS (AGPS) system, having assistance data management, such as, e.g., AGPS data management, according to an embodiment of the disclosure. The AGPS system 100, which is a GPS implementation of the ASP system, may include a plurality of GPS satellites 110A, 110B, 110C, an assistance server 120, a mobile station 200 and the like. The mobile station 200 may be configured to regularly acquire AGPS data from a cellular network. The AGPS data may include satellite positioning data for a fixture in the cellular network or the like. The AGPS data is typically positioning data provided by a base station or tower to which a user equipment may be registered. Alternatively, the mobile station 200 may be configured to acquire the AGPS data only when there is a user request for a GPS service. Regularly or in response to the user request, the mobile station 200 may request that the assistance server 120 provides the mobile station 200 with AGPS data, such as, e.g., almanac, ephemeris and the like, for the current location related to a location of a fixture while attempting to receive and process the GPS signals $S_{GPS1}$, $S_{GPS2}$, $S_{GPS3}$ from the GPS satellites 110A, 110B, 110C, respectively.

The assistance server 120 may also receive the GPS signals $S_{GPS1}$, $S_{GPS2}$, $S_{GPS3}$, from the GPS satellites 110A, 110B, 110C, respectively, via an antenna 130. In response to the request from the mobile station 200, the assistance server 120 may approximately locate the mobile station 200 based on coordinates of base stations 140 (only one shown). Once the location of the mobile station 200 is determined, the assistance server 120 may process the received GPS signals $S_{GPS1}$, $S_{GPS2}$, $S_{GPS3}$, after considering known ionospheres conditions and other errors effecting the GPS signals $S_{GPS1}$, $S_{GPS2}$, $S_{GPS3}$, if necessary, in order to generate AGPS data specific to the current location of the mobile station 200. The AGPS data may be transmitted to the mobile station 200 via the base station 140 of a cell site in which the mobile station 200 may be registered.

The mobile station 200 may be configured to store and manage the AGPS data received from the assistance server 120 for current or future uses (reuses). For example, when there is a user request for a GPS service, the mobile station 200 may determine whether the AGPS data stored therein is usable. By recycling or reusing the stored AGPS data, the mobile station 200 may complete the Time to First Fix (TTFF) process in a shorter period of time. Further, when AGPS data is recycled, the assistance server 120 may not need to provide AGPS data to the mobile station 200 and, hence, the processing burden of the assistance server 120 may be reduced and cellular network traffic may also be reduced.

AGPS data reusability may be determined by several factors or a combination thereof, such as, e.g., how old the AGPS data is, for which specific location the AGPS data was acquired, and/or the like. AGPS data may no longer be valid after a predetermined period of time has lapsed because, for example, ephemeris data may be valid only for few hours, e.g., about four hours. To determine how old the stored AGPS data is, the mobile station 200 may compare the time when the user request for the GPS service was received with the time when the stored AGPS data was acquired. If the stored AGPS data is older than a predetermined period of time (e.g., the user request occurs after the predetermined time, for example, about two hours, has lapsed since the stored AGPS has acquired), the mobile station 200 may determine that the stored AGPS data is no longer valid and request the assistance server 120 provide new AGPS data. When the stored AGPS data is not older than the predetermined period of time, the mobile station 200 may determine that the stored AGPS data is current and then use the stored AGPS data to determine its position using the GPS signals $S_{GPS1}$, $S_{GPS2}$, $S_{GPS3}$.

Upon determining that the stored AGPS data is current, the mobile station 200 may determine whether the stored AGPS data may be used for the current location of the mobile station 200. For this purpose, the mobile station 200 may rely on location information, such as, e.g., a Location Area Identity (LAI), which is a unique identifier assigned to each location area 150 of the Public Land Mobile Network (PLMN). A LAI includes a three-digit Country Code (CC), a two-digit Mobile Network Code (MNC) and a five-digit Local Area Code (LAC) of the corresponding location area 150. The base station 140 may regularly broadcast a LAI of the corresponding location area 150 via a Broadcast Control Channel (BCC). When the mobile station 200 acquires and stores the AGPS data, the mobile station 200 may also acquire and store the associated LAI for the location area 150 in which the mobile station 200 is currently positioned. The LAI may be associated to the corresponding AGPS data for future reference.

Upon receiving the user request for the GPS service, the mobile station 200 may acquire a LAI of the current location area 150. The LAI of the current location area 150 may be compared with the stored LAI associated to the stored AGPS data in order to determine whether the stored AGPS data may be used for the current location area 150. If the new LAI for the current location area 150 and the stored LAI associated with the stored AGPS data are the same, the mobile station 200 may determine that the stored AGPS data may be used for the current location area 150, and then retrieve and use the stored AGPS data to execute the requested GPS service. By recycling the stored AGPS data, the mobile station 200 may complete the TTFF process in a shorter period of time. Further, when AGPS data is recycled, the assistance server 120 may not need to provide AGPS data to the mobile station 200 and, hence, the processing burden of the assistance server 120 may be reduced. Moreover, cellular network traffic may be reduced because AGPS data is requested and sent less frequently.

However, if the current LAI is different from the LAI of the stored AGPS data, the mobile station 200 may determine that the stored AGPS data is not usable for the current location area 150 and request the assistance server 120 to provide new AGPS data for the current location area 150. The mobile station 200 may store more than one set of AGPS data and its associated LAI. For example, the mobile station 200 may have a database containing multiple AGPS data/LAI sets for future uses.

Figure 2:
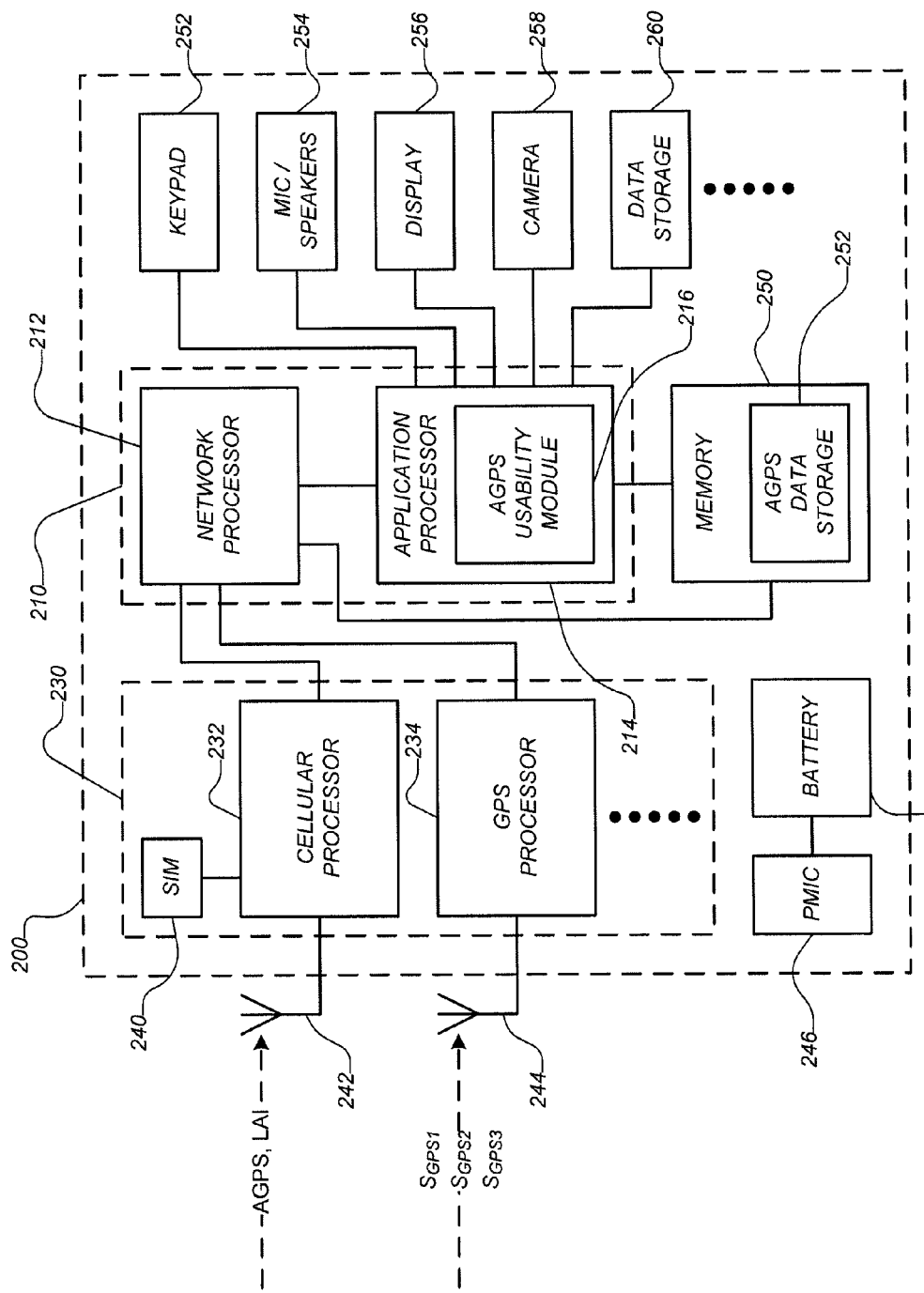
FIG. 2 shows a configuration of a GPS receiver having AGPS data management, according to an embodiment of the disclosure.

FIG. 2 shows a configuration of a mobile station, such as the mobile station 200 shown in FIG. 1, constructed according to an embodiment of the disclosure. The mobile station 200 may be any type of electronic device, such as, but not limited to, e.g., a GPS device, a cellular telephone device, a personal data assistant (PDA), a portable computer device, or any other device capable of receiving GPS signals and AGPS data. The mobile station 200 may include a plurality of processors and peripheral devices. The processors may include, for example, a main processor block 210, a communication processor block 230, and/or the like. The main processor block 210 may include the network processor 212, the application processor 214 and/or the like, which may be implemented as a single processor. The communication processor block 230 may include one or more communication processors, such as, e.g., a cellular processor 232, a GPS processor 234 and/or the like. The communication processor block 230 may further include a subscriber identity module (SIM) 240, which may be connected to the cellular processor 232 and store a service-subscriber key for a cellular network. The peripheral devices may include a memory 250, a keypad 252, a microphone and speaker 254, a display 256, a camera 258, a data storage device 260 and/or the like. The mobile station 200 may further include a power management integrated circuit (PMIC) 246 and a battery 248.

The application processor 214 may control the overall operation of the mobile station 200, including, for example, GPS service. For example, the application processor 214 may include an AGPS usability module 216, which may be configured to determine whether the previously acquired AGPS data is reusable when there is a request for a GPS service. Further, the application processor 214 may be configured to control the peripheral devices, such as, for example, the memory 250, the keypad 252, the microphone and speaker 254, the display 256, the camera 258, the data storage device 260, and/or the like. The memory 250 may store a GPS software program, AGPS data/LAI set, AGPS data/LAI acquisition time data and/or the like. The memory 250 may store more than one AGPS data/LAI sets. For example, the memory 250 may contain an AGPS data storage 252 which may include a database containing multiple AGPS data/LAI sets. The memory 250 may be a random access memory (RAM), a read only memory (ROM), a low latency nonvolatile memory (such as, e.g., a flash memory) or any other suitable electronic data storage. The data storage 260 may be configured to store data in a nonvolatile manner such as, but not limited to, for example, an optical and/or magnetic storage device, including a hard disk drive and a removable data storage.

The network processor 212 may be configured to control the communication processor block 230, including, for example, the cellular processor 232 and the GPS processor 234. Regularly or when there is a user request for the GPS service, the network processor 212 may control the cellular processor 232 to request AGPS data via an antenna 242. Upon receiving the request from the mobile station 200, the assistance server 120 may supply AGPS data to the mobile station 200 via the base station 140 of the cell site in which the mobile station 200 is currently positioned. The base station 140 may also transmit a LAI of the current location area 150 where the mobile station 200 is currently located. The cellular processor 232 may receive the AGPS data and the LAI via the antenna 242. The received AGPS data and LAI may be stored in the memory 250. The network processor 212 may also store the time when the AGPS data and LAI have been acquired.

When there is a user request for the GPS service, the main processor block 210, e.g., the application processor 214, may determine whether the AGPS data stored in the memory 250 is reusable for the current GPS service session. For example, the application processor 214 may analyze the AGPS data/LAI set and the AGPS data acquisition time stored in the memory 250. The application processor 214 may compare the GPS service request time with the AGPS data acquisition time to determine whether the stored AGPS data is recent or old. If the stored AGPS data is older than the predetermined period of time, the application processor 214 may instruct the network processor 212 to acquire new AGPS data from the assistance server 120.

If the stored AGPS data is recent, the application processor 214 may determine whether the stored AGPS data is usable for the current location of the mobile station 200. For example, the network processor 212 may instruct the cellular processor 232 to obtain a new LAI of the current location area 150 where the mobile station 200 is currently located. Then, the application processor 214 may compare the new LAI of the current location area 150 and the stored LAI associated to the stored AGPS data. If the new LAI and the LAI associated with the previously acquired AGPS data are different, the application processor 214 may determine that the stored AGPS data may not be useable. Then, the application processor 214 may instruct the network processor 212 to acquire new AGPS data.

If the new LAI and the stored LAI associated with the previously acquired AGPS data are the same, the application processor 212 may determine that the AGPS data stored in, for example, the AGPS data storage 252 of the memory 250 (shown in FIG. 2) may be reusable and retrieve the stored AGPS data to execute the requested GPS service. By recycling the stored AGPS data, the mobile station 200 may complete the TIFF process in a shorter period of time. Further, when AGPS data is recycled, the assistance server 120 may not need to provide AGPS data to the mobile station 200 and, hence, the processing burden of the assistance server 120 and cellular network traffic may be reduced as well.

Figure 3:
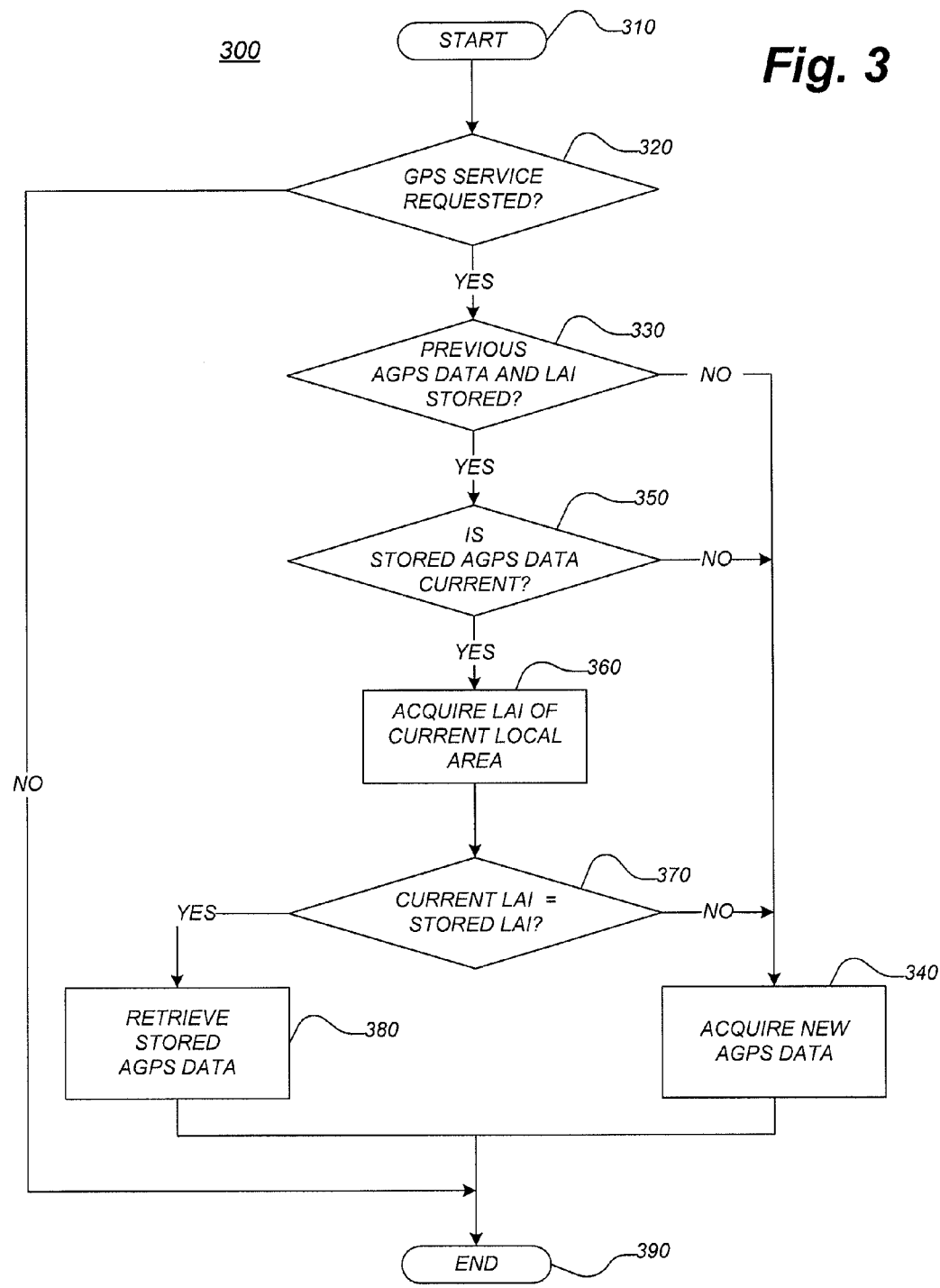
FIG. 3 shows a flow chart of an AGPS data management process according to an embodiment of the disclosure.

FIG. 3 shows a flow chart of an AGPS data management process 300, according to an embodiment of the disclosure. The process 300 may be executed with the mobile station 200 of FIG. 2 or another mobile station with a different configuration. Upon starting the process at step 310, a mobile station may be ready to execute a GPS service. When there is a request for the GPS service at step 320, a processor running a GPS software program may determine whether a memory stores AGPS data and its associated LAI at step 330. If there is no stored AGPS data and LAI at step 330, the mobile station may acquire new AGPS data and a LAI for the current location area 150 at step 340. If previous AGPS data and its associated LAI are stored in the memory at step 330, the processor may determine whether the stored AGPS data is current or not at step 350.

As explained above, AGPS data may be valid for only a predetermined period of time. Thus, if the stored AGPS data is older than the predetermined period of time, the mobile station may determine that the stored AGPS data is not current and acquire new AGPS data at step 340. If the stored AGPS data is current at step 350, the mobile station may acquire a new LAI of the current location area 150 where the mobile station is currently positioned at step 360. If the newly acquired LAI is the same as the stored LAI associated to the stored AGPS data at step 370, the processor may retrieve the stored AGPS data to execute the requested GPS service at step 380. In this case, it may not be necessary for the mobile station to receive new AGPS data from the cellular network. Thus, the mobile station may complete the TTFF process in a shorter period of time. Moreover, cellular network traffic may be reduced because AGPS data is less frequently requested and sent. Upon retrieving the stored AGPS data for the requested GPS service at step 380, the AGPS data management process 300 may end at step 390. If the newly acquired LAI is not the same with the stored LAI associated to the stored AGPS data at step 370, the mobile station may acquire new AGPS data at step 340, and the process 300 may terminate at step 390.

As used herein, a mobile station refers to any suitable device such as a cellular telephone, wireless communication device, user equipment on a cellular network, other personal communication system (PCS) device, a position determination device employing position determination techniques or the like. The term "network" and "system" are often used interchangeably. The Mobile Station may receive signals from a cellular network, such as, e.g., a Code Division Multiple Access (CDMA) network (i.e., cdma2000, Wideband-CDMA (W-CDMA) and the like), a Time Division Multiple Access (TDMA) network (i.e., Global System for Mobile Communications (GSM), Digital Advanced Mobile Phone System (D-AMPS) and the like), a Frequency Division Multiple Access (FDMA) network, an Orthogonal Frequency Division Multiple Access (OFDMA) network (i.e., 3GPP Long Term Evolution (LTE) and the like), a Single-Carrier Frequency Division Multiple Access (SC-FDMA) network, and so on.

The various embodiments of the disclosure described herein may be intended for operation with dedicated hardware implementations including, but not limited to, semiconductors, application specific integrated circuits (ASIC), programmable logic arrays, and other hardware devices constructed to implement the methods and modules described herein. However, the embodiments of the disclosure may be implemented for operation as software programs running on a computer processor. Furthermore, alternative software implementations including, but not limited to, distributed processing or component/object distributed processing, parallel processing, virtual machine processing, any future enhancements, or any future protocol can also be used to implement the methods described herein.

While the disclosure has been described in terms of examples of the embodiments, those skilled in the art will recognize that the disclosure can be practiced with modifications in the spirit and scope of the appended claims. These examples given above are merely illustrative and are not meant to be an exhaustive list of all possible designs, embodiments, applications or modifications of the disclosure.

What is claimed is:

1. A method of determining a position, comprising:
    acquiring and storing first Assisted Satellite Positioning (ASP) data in a mobile user equipment associated with a cellular network, the first ASP data being provided by a cellular network base station, the stored first ASP data being associated with first location information that includes a first local area identity, the first location information being received by the mobile user equipment from the cellular network base station, the first ASP data and the associated first location information being stored in a data store at the mobile user equipment, the data store being configured to contain multiple sets of ASP data and associated location information that includes local area identities for future uses;
    receiving a request for a position determination service;
    determining whether the first ASP data is usable for the requested position determination service by:
        acquiring second location information that includes a second local area identity associated with a current location of the mobile user equipment; and
        comparing the first location information associated with the ASP data from the cellular network base station and the second location information identifying the current location of the mobile user equipment to determine whether the first ASP data is usable for the current location of the mobile user equipment;
    when the first ASP data is usable for the requested position determination service, determining a position of the mobile user equipment based partially on the first ASP data;
    when the current location is different from the first location associated with the ASP data from the cellular network base station and the ASP data is not usable for reducing a time to first fix of a satellite positioning receiver, acquiring new ASP data associated with the current location of the mobile user equipment.

2. The method of claim 1, wherein the determining whether the first ASP data is usable comprises:
    determining whether the first ASP data is older than a predetermined period of time; and
    determining whether the first ASP data is usable for a current location of the mobile user equipment.

3. The method of claim 1, wherein the acquiring the first location information and second location information comprises acquiring a Local Area Identity (LAI) from a base station of the cellular network which the mobile user equipment is associated with at the time of acquisition thereof.

4. A non-transitory computer readable storage medium having a stored computer program embodying instructions, which, when executed by a computer, cause the computer to determine a position, the computer readable storage medium comprising:
    instructions for acquiring and storing first Assisted Satellite Positioning (ASP) data in a mobile user equipment associated with a cellular network, the first ASP data being provided by a cellular network base station, the stored first ASP data being associated with first location information that includes a first local area identity, the first location information being received by the mobile user equipment from the cellular network base station, the first ASP data and the first location information being stored in a data store at the mobile user equipment, the data store being configured to contain multiple sets of ASP data and associated location information that includes local area identities for future uses;
    instructions for receiving a request for a position determination service;
    instructions for determining whether the first ASP data is usable for the requested position determination service by:
        acquiring second location information that includes a second local area identity associated with a current location of the mobile user equipment; and
        comparing the first location information associated with the ASP data from the cellular network base station and the second location information identifying the current location of the mobile user equipment to determine whether the first ASP data is usable for the current location of the mobile user equipment;

when the first ASP data is usable for the requested position determination service, determining a position of the mobile user equipment based partially on the first ASP data;

when the current location is different from the ASP data from the cellular network base station and the ASP data is not usable for reducing a time to first fix of a satellite positioning receiver, acquiring new ASP data associated with the current location of the mobile user equipment.

5. The non-transitory computer readable storage medium of claim 4, wherein the instructions for determining whether the first ASP data is usable comprises:

instructions for determining whether the first ASP data is older than a predetermined period of time; and instructions for determining whether the first ASP data is usable for a current location of the mobile user equipment.

6. The non-transitory computer readable storage medium of claim 4, wherein the instructions for acquiring the first location information and second location information comprise instructions for acquiring a Local Area Identity (LAI) from a base station of the cellular network which the mobile user equipment is associated with at the time of acquisition thereof.

7. A method of managing Assisted Satellite Positioning (ASP) data in a mobile station, comprising:

acquiring and storing first ASP data and first location information that includes a first local area identity associated with the first ASP data, the first ASP data and the first location information being provided by a cellular network base station, the first ASP data and the associated first location information being stored in a data store at the mobile station, the data store being configured to contain multiple sets of ASP data and associated location information that includes local area identities for future uses;

receiving a request for a position determination service;

acquiring second location information that includes a second local area identity associated with a current location of the mobile station upon receiving the request;

determining whether the stored first ASP data is older than a predetermined period of time;

determining whether the first location information and the second location information are the same by:

comparing the first location information associated with the ASP data from the cellular network base station and the second location information identifying the current location of the mobile station to determine whether the first ASP data is usable for the current location of the mobile station;

when the first ASP data is not older than the predetermined period of time and the first location information and the second location information are the same, determining a position of the mobile station based partially on the first ASP data for the requested position determination service;

when the first ASP data is older than the predetermined period or the first location information and the second location information are not the same and the first ASP data is not usable for reducing a time to first fix of a satellite positioning receiver, acquiring new ASP data associated with the current location of the mobile station.

8. The method of claim 7, wherein the step of determining whether the first ASP data is older than the predetermined period of time comprises:

obtaining a first time of acquiring the first ASP data and a second time of receiving the request; and determining whether a time between the first time and the second time is greater than the predetermined time period.

9. The method of claim 7, wherein the predetermined time period is about two hours.

10. The method of claim 7, wherein each of the first location information and second location information is related to a location of a base station of a cellular network which the mobile station is associated with at the time of acquisition thereof.

11. The method of claim 10, wherein the acquiring the first location information and second location information comprises acquiring a Local Area Identity (LAI) from a base station of a cellular network which the mobile station is associated with at the time of acquisition thereof.

12. The method of claim 7, wherein the mobile station is a cellular network user equipment.

13. A non-transitory computer readable storage medium having a stored computer program embodying instructions, which, when executed by a computer, cause the computer to manage Assisted Satellite Positioning (ASP) data in a mobile station, the computer readable storage medium comprising:

instructions for acquiring and storing first ASP data and a first location information that includes a first local area identity associated with the first ASP data, the first ASP data and the first location information being provided by a cellular network base station, the first ASP data and the associated first location information being stored in a data store at the mobile station, the data store being configured to contain multiple sets of ASP data and associated location information that includes local area identities for future uses;

instructions for receiving a request for a position determination service;

instructions for acquiring second location information that includes a second local area identity associated with a current location of the mobile station upon receiving the request;

instructions for determining whether the stored first ASP data is older than a predetermined period of time;

instructions for determining whether the first location information and the second location information are the same by:

comparing the first location information from the cellular network base station and the second location information identifying the current location of the mobile station to determine whether the first ASP data is usable for the current location of the mobile station;

instructions for when the first ASP data is not older than the predetermined period of time and the first location information and the second location information are the same, determining a position of the mobile station based partially on the first ASP data for the requested position determination service;

instructions for when the first ASP data is older than the predetermined period or the first location information and the second location information are not the same and the first ASP data is not usable for reducing a time to first fix of a satellite positioning receiver, acquiring new ASP data associated with the current location of the mobile station.

14. The non-transitory computer readable storage medium of claim 13, wherein the instructions for determining whether the first ASP data is older than the predetermined period of time comprises:

instructions for obtaining a first time of acquiring the first ASP data and a second time of receiving the request; and instructions for determining whether a period time between the first time and the second time is greater than the predetermined time period.

15. The non-transitory computer readable storage medium of claim 13, wherein the predetermined time period is about 2 hours.

16. The non-transitory computer readable storage medium of claim 13, wherein each of the first location information and second location information is related to a location of a base station of a cellular network which the mobile station is associated with at the time of acquisition thereof.

17. The non-transitory computer readable storage medium of claim 16, wherein the instructions for acquiring the first location information and second location information comprise instructions for acquiring a Local Area Identity (LAI) from a base station of a cellular network which the mobile station is associated with at the time of acquisition thereof.

18. A cellular network user equipment comprising the non-transitory computer readable storage medium of claim 13.

19. A mobile station, comprising:
a storage unit storing first Assisted Satellite Positioning (ASP) data and first location information that includes a first local area identity associated with the first ASP data, the first ASP data and the first location information being provided by a cellular network base station, the storage unit being a data store at the mobile station, the data store being configured to contain multiple sets of ASP data and associated location information that includes local area identities for future uses;
a user interface configured to receive a user request for a position determination service;
a cellular unit configured to acquire second location information that includes a second local area identity associated with a current location of the mobile station upon receiving the user request; and
a processor configured to:
compare the first location information from the cellular network base station and the second location information identifying the current location of the mobile station to determine whether the ASP data is usable for the current location of the mobile station;
when the first ASP data is usable for the requested position determination service, determining a position of the mobile station based partially on the first ASP data;
when the current location is different from the first location associated with the ASP data from the cellular network base station and the ASP data is not usable for reducing a time to first fix of a satellite positioning receiver, acquiring new ASP data associated with the current location of the mobile user equipment.

20. The mobile station of clam 19, wherein the processor is further configured to compare a first time of acquiring the first ASP data with a second time of receiving the user request to determine when the first ASP data is older than the predetermined period of time.

21. The mobile station of claim 19, wherein the predetermined period of time is about two hours.

22. The mobile station of claim 19, wherein each of the first local information and second location information is related to a location of a base station of a cellular network which the mobile station is associated with at the time of acquisition thereof.

23. The mobile station of claim 22, wherein each of the first local information and second location information comprises a Local Area Identity (LAI) broadcasted from the base station of the cellular network which the mobile station is associated at the time of the acquisition thereof.

24. The mobile station of claim 19 comprises a cellular network user equipment.

25. The method of claim 1, wherein the first ASP data and the first location information are acquired at the same time.

26. The computer readable storage medium of claim 4, wherein the first ASP data and the first location information are acquired at the same time.

\* \* \* \* \*